(12) United States Patent
Kumar

(10) Patent No.: US 6,828,746 B2
(45) Date of Patent: Dec. 7, 2004

(54) METHOD AND SYSTEM USING TRACTION INVERTER FOR LOCKED AXLE DETECTION

(75) Inventor: Ajith Kuttannair Kumar, Erie, PA (US)

(73) Assignee: General Electric Company, Schenectady, NY (US)

( * ) Notice: Subject to any disclaimer, the term of this patent is extended or adjusted under 35 U.S.C. 154(b) by 107 days.

(21) Appl. No.: 10/317,770

(22) Filed: Dec. 12, 2002

(65) Prior Publication Data

US 2004/0113571 A1 Jun. 17, 2004

(51) Int. Cl.⁷ ............................................. B61C 17/00
(52) U.S. Cl. ..................... 318/490; 104/307; 105/26.05
(58) Field of Search ................. 318/459, 490; 388/909; 104/307; 105/26.05, 49, 77, 78, 463.1; 324/500

(56) References Cited

U.S. PATENT DOCUMENTS

| | | | |
|---|---|---|---|
| 3,743,901 A | * 7/1973 | Johnson ........................ 318/87 |
| 3,927,359 A | * 12/1975 | Chen ........................... 318/434 |
| 4,009,431 A | * 2/1977 | Johnson .......................... 322/7 |
| 4,023,083 A | 5/1977 | Plunkett |
| 4,039,914 A | 8/1977 | Steigerwald et al. |
| 4,088,934 A | 5/1978 | D'Atre et al. |
| 4,093,900 A | 6/1978 | Plunkett |
| 4,203,058 A | * 5/1980 | Chen ........................... 318/380 |
| 4,215,304 A | 7/1980 | D'Atre et al. |
| 4,237,410 A | 12/1980 | Erickson et al. |
| 4,344,364 A | 8/1982 | Nickles et al. |
| 4,360,873 A | 11/1982 | Wilde et al. |
| 4,503,940 A | 3/1985 | Watanabe |
| 4,686,434 A | 8/1987 | Kojima et al. |
| 4,733,146 A | 3/1988 | Hamby |
| 4,761,600 A | 8/1988 | D'Atre et al. |
| 4,904,918 A | 2/1990 | Bailey et al. |
| 4,920,475 A | 4/1990 | Rippel |
| 4,937,507 A | 6/1990 | Masui et al. |
| 5,099,186 A | 3/1992 | Rippel et al. |
| 5,170,105 A | 12/1992 | Kumar |
| 5,283,507 A | 2/1994 | Stitt et al. |
| 5,291,960 A | 3/1994 | Brandenburg et al. |
| 5,323,095 A | 6/1994 | Kumar |
| 5,357,181 A | 10/1994 | Mutoh et al. |
| 5,363,032 A | 11/1994 | Hanson et al. |
| 5,436,540 A | 7/1995 | Kumar |
| 5,446,362 A | 8/1995 | Vanek et al. |
| 5,512,811 A | 4/1996 | Latos et al. |
| 5,528,445 A | 6/1996 | Cooke et al. |
| 5,614,796 A | 3/1997 | Minderlein et al. |
| 5,629,567 A | 5/1997 | Kumar |
| 5,642,270 A | 6/1997 | Green et al. |
| 5,646,510 A | 7/1997 | Kumar |
| 5,721,479 A | 2/1998 | Kumar et al. |

(List continued on next page.)

*Primary Examiner*—Bentsu Ro
(74) *Attorney, Agent, or Firm*—Senniger Powers; Carl Rowold

(57) ABSTRACT

A method and system for detecting the occurrence of an actual locked condition in a locomotive system having a locomotive operating in an isolated mode of operation. The locomotive has a plurality of AC traction motors for propelling the locomotive system during normal operations. The AC motors are reconfigurable to operate as AC generators and are connected to a common DC bus. When a potential locked condition in a first motor is detected, the DC bus is energized with an initial voltage using an alternate source of power. The DC bus voltage is regulated with a second motor by reconfiguring the second motor to operate as a generator. The torque produced by the first motor is then measured at a plurality of levels of electromagnetic flux in the first motor. Based on the measured torque, it is determined whether the potential locked condition is an actual locked condition.

17 Claims, 5 Drawing Sheets

U.S. PATENT DOCUMENTS

| | | |
|---|---|---|
| 5,915,801 A | 6/1999 | Taga et al. |
| 5,936,855 A | 8/1999 | Salmon |
| 5,990,648 A | 11/1999 | Kumar et al. |
| 5,992,950 A | 11/1999 | Kumar et al. |
| 5,998,880 A | 12/1999 | Kumar |
| 6,023,137 A | 2/2000 | Kumar et al. |
| 6,209,672 B1 | 4/2001 | Severinsky |
| 6,267,062 B1 | 7/2001 | Hamilton, Jr. |
| 6,289,873 B1 | 9/2001 | Dunsworth |
| 6,346,784 B1 | 2/2002 | Lin |
| 6,359,346 B1 * | 3/2002 | Kumar ............... 290/40 A |
| 6,401,015 B1 | 6/2002 | Stewart et al. |
| 6,408,766 B1 | 6/2002 | McLaughlin et al. |
| 6,456,908 B1 * | 9/2002 | Kumar ............... 701/19 |
| 2001/0019253 A1 | 9/2001 | Hammond et al. |
| 2001/0039230 A1 | 11/2001 | Severinsky et al. |
| 2003/0144770 A1 * | 7/2003 | Kumar ............... 701/19 |

\* cited by examiner

METHOD AND SYSTEM USING TRACTION INVERTER FOR LOCKED AXLE DETECTION

BACKGROUND OF THE INVENTION

1. Field of the Invention

The present invention is related generally energy systems and methods for use in connection with large, off-highway vehicles such as locomotives and in particular, to a method and system for detecting a locked-axle condition in a vehicle operating in an isolated mode of operation.

2. Brief Description of the Prior Art

Locomotives and transit vehicles as well as other large traction vehicles are commonly powered by electric traction motors coupled in driving relationship to one or more axles of the vehicle. Locomotives and transit vehicles generally have at least four axle-wheel sets per vehicle with each axle-wheel set being connected via suitable gearing to the shaft of a separate electric motor commonly referred to as a traction motor. In the motoring mode of operation, the traction motors are supplied with electric current from a controllable source of electric power (e.g., an engine-driven traction alternator) and apply torque to the vehicle wheels which exert tangential force or tractive effort on the surface on which the vehicle is traveling (e.g., the parallel steel rails of a railroad track), thereby propelling the vehicle in a desired direction along the right of way. Alternatively, in an electrical braking mode of operation, the motors serve as axle-driven electrical generators, torque is applied to their shafts by their respectively associated axle-wheel sets, which then exert braking effort on the surface, thereby retarding or slowing the vehicle's progress. The motor generated energy is dispersed in a grid of resistors.

Locomotives used for hauling applications are generally equipped with speed sensors coupled to respective traction motors or to the axles driven by the motors. The speed sensor data or information may be used to detect a locked axle condition. If a locked axle condition occurs on a given axle while the locomotive is moving, the rotational speed of that axle decreases to zero, and all other axles rotate at a speed corresponding to the speed of the locomotive. Thus, a locked axle condition can be detected whenever a substantial difference in speed is sensed in one axle relative to the other axles.

In addition, when a speed sensor fails to supply reliable sensor data, a locked axle condition may be indicated in a system controller since existing controllers are not generally capable of detecting speed sensor failures. When a locked axle condition is indicated, the operator generally has to stop the train and visually inspect the axle or wheels for any discernable damage. If the visual inspection does not reveal any useful information, then the train may have to be rolled slightly to ascertain whether in fact the axle is locked or whether the condition was indicated due to a faulty speed sensor. If the latter is true, then the locomotive can be operated at lower speeds until the speed sensor and/or speed detection system can be repaired. Stopping trains, inspecting axles, and operating at lower speeds involve burdensome delays.

One method of monitoring for locked axle conditions is generally achieved using speed sensors on the traction motors. However, the speed sensor systems have high failure rates due to the treacherous environment in which they operate. Co-assigned U.S. Pat. No. 5,990,648 entitled "Method for Detecting Locked-Axle Conditions Without a Speed Sensor" issued to Kumar et al., describes a method of detecting locked axle conditions without the use of speed sensors.

However, situations involving heavy haul applications generally use multiple locomotives in a consist to provide the total power/tractive effort required to run the train from the starting point to the destination point. Invariably the number of locomotives in the consist may be larger than the number of locomotives required for several portions of the trip. Diesel-electric locomotives are often loud and the vibrations associated with the engine make the environment uncomfortable for train operators. Therefore, operators tend to isolate one or more locomotive units in the consist to save fuel and/or reduce the noise and vibration in the units for crew comfort. The diesel engine in the isolated locomotive is run at low speeds and the alternator field and its control are disabled. In such a condition, the diesel engine cannot be used as a source of electrical power.

The method disclosed in the '648 patent requires the traction inverter to control the traction motor so as to produce flux in the traction motors so as to produce appropriate polarity torque to determine if the motors are turning or not. Therefore these traction inverters need to have DC bus voltage to achieve this function. However, when a locomotive is put into isolate mode, the DC bus cannot be powered by the diesel engine and the locked axle detection without speed sensors method as disclosed in the '648 patent can not be used. This causes many locomotives to be unnecessarily shopped for speed sensor failure. Thus, there is a need for a method which will reliably distinguish between an actual locked axle condition and an erroneously detected axle condition indicated based on a speed sensor failure for use with a locomotive operating in an isolated mode.

BRIEF DESCRIPTION OF THE INVENTION

In one embodiment, the invention is a method for detecting the occurrence of an actual locked condition in one or more of a plurality of AC traction motors which are reconfigurable to operate as AC generators, wherein said AC traction motors connected to a common DC bus. The method includes detecting a potential locked condition in a first motor, energizing the DC bus with an initial voltage using an alternate source of power, and regulating the DC bus voltage with a second motor of the plurality of AC traction motors by reconfiguring the second motor to operate as a generator. The method further includes measuring torque produced by the first motor at a plurality of levels of electromagnetic flux in the first motor, and determining based on the measured torque whether the potential locked condition is an actual locked condition.

In another embodiment, the invention is a system for detecting the occurrence of an actual locked-axle condition in an isolated vehicle having a plurality of AC traction motors which are reconfigurable to operate as AC generators, said AC traction motors connected to a common DC bus. The system includes a speed sensor detecting a potential locked axle condition in an axle coupled to a first motor of the plurality of AC traction motors, and a power supply energizing the DC bus with an initial voltage using an alternate source of power. The system further includes a voltage regulator regulating DC bus voltage with a second motor of the plurality of AC traction motors by reconfiguring the second motor to operate as a generator, and a torque sensor measuring a torque produced by the first motor at a plurality of levels of electromagnetic flux in the first motor.

The system further includes a processor determining based on the measured torque whether the potential locked-axle condition is an actual locked axle condition.

BRIEF DESCRIPTION OF THE DRAWINGS

The above-mentioned and other features of the invention, and the manner of obtaining them, will become more apparent and the invention itself will be better understood by reference to the following description of the embodiments of the invention taken in conjunction with the accompanying drawings, wherein.

DETAILED DESCRIPTION

Figure 1:
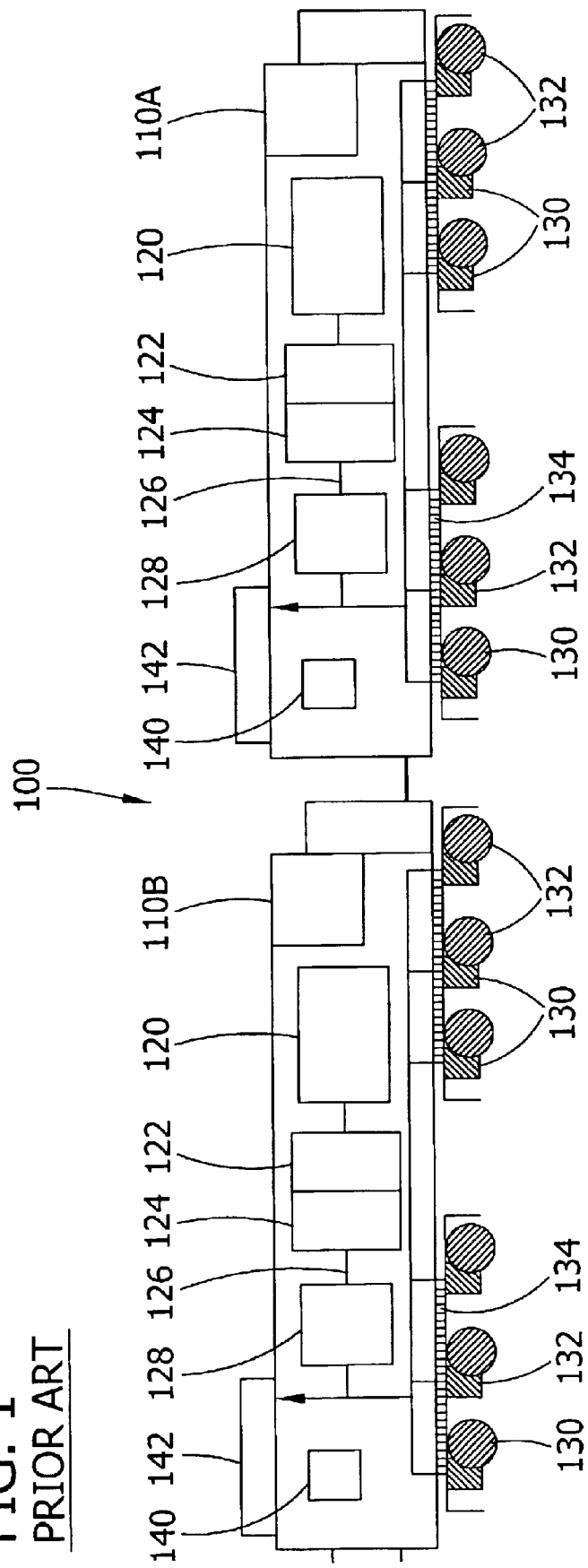
FIG. 1 is a block diagram of two diesel-electric locomotives operating in consist according to the prior art.

The present invention may be utilized in various types of alternating current (AC) induction motor powered vehicles such as, for example, transit cars and locomotives. By way of illustration, the invention is described herein as it may be applied to locomotives. FIG. 1 illustrates one possible operational example of a locomotive system 100 having a first locomotive 110A and a second locomotive 10B in a consist (hereinafter, referred to collectively as locomotive 110). The locomotive 110 may be, for example, an AC diesel-electric locomotive. Locomotive 110 includes a diesel engine 120 that drives an alternator 122 and a rectifier 124. As is generally understood in the art, 3-phase voltages developed by the alternator 122 are applied to AC input terminals of the power rectifier bridge 124. The direct current (DC) output of the rectifier 124 is coupled via a DC bus 126 to one or more inverters 128 which invert the DC power to AC power at a selectable variable frequency. The inverter 128 is electrically coupled in energizing relationship to each of a plurality of adjustable speed AC traction motors 130. As is understood in the art, traction motors 130 provide the tractive power to move the locomotive system 100 and any other vehicles, such as load vehicles, attached to locomotive system 100.

One common locomotive configuration includes one inverter 128 and traction motor 130 coupled to an axle/wheel set 132. Such a configuration results in three inverters 128 per truck 134, and six inverters 128 and traction motors 130 per locomotive 110. Each of the traction motors 130 is hung on a separate axle-wheel set 132 and is mechanically coupled, via conventional gearing (not shown), in a driving relationship to the associated axle-wheel set 132. FIG. 1 illustrates a single inverter 128 for convenience. However, it is understood, but not necessary, that each traction motor 130 is coupled to an associated inverter 128. During normal operation, the magnitude of output voltage and current supplied to rectifier bridge 124 is determined by the magnitude of excitation current supplied to the field windings of the alternator 122. The excitation current is set in response to an operator demand for vehicle speed to a controller 140 which is in turn responsive to actual speed as represented by speed signals. The controller 140 converts the speed command to a corresponding torque command for use in controlling the motors 130. Since AC motor torque is proportional to rotor current and air gap flux, these quantities may be monitored; or, alternatively, other quantities such as applied voltage, stator current and motor RPM may be used to reconstruct motor torque in controller 140 as is known in the art.

In one embodiment, locomotive 110A and the traction motors 130 located thereon supply tractive power for the locomotive system 100. Locomotive 110B represents a locomotive that is not being used at the current time for tractive power. Typically, such locomotives that are not being used for tractive power are put into an isolate mode with its associated diesel engine 120 operating at low speeds and the associated alternator 122 disabled.

The traction motors 130 also provide a braking force for controlling speed or for slowing locomotive system 100. This is commonly referred to as dynamic braking, and is generally understood in the art. Simply stated, when a traction motor is not needed to provide motivating force, it can be reconfigured (via power switching devices) so that the motor operates as a generator. So configured, the traction motor generates electric energy which has the effect of slowing the locomotive. In prior art locomotives, the energy generated in the dynamic braking mode is typically transferred to a resistance grid 142 mounted on the locomotive. Thus, the dynamic braking energy is converted to heat and dissipated from the system. In other words, electric energy generated in the dynamic braking mode is typically wasted. Motor voltage and current are controlled to set a desired braking effort.

Figure 2:
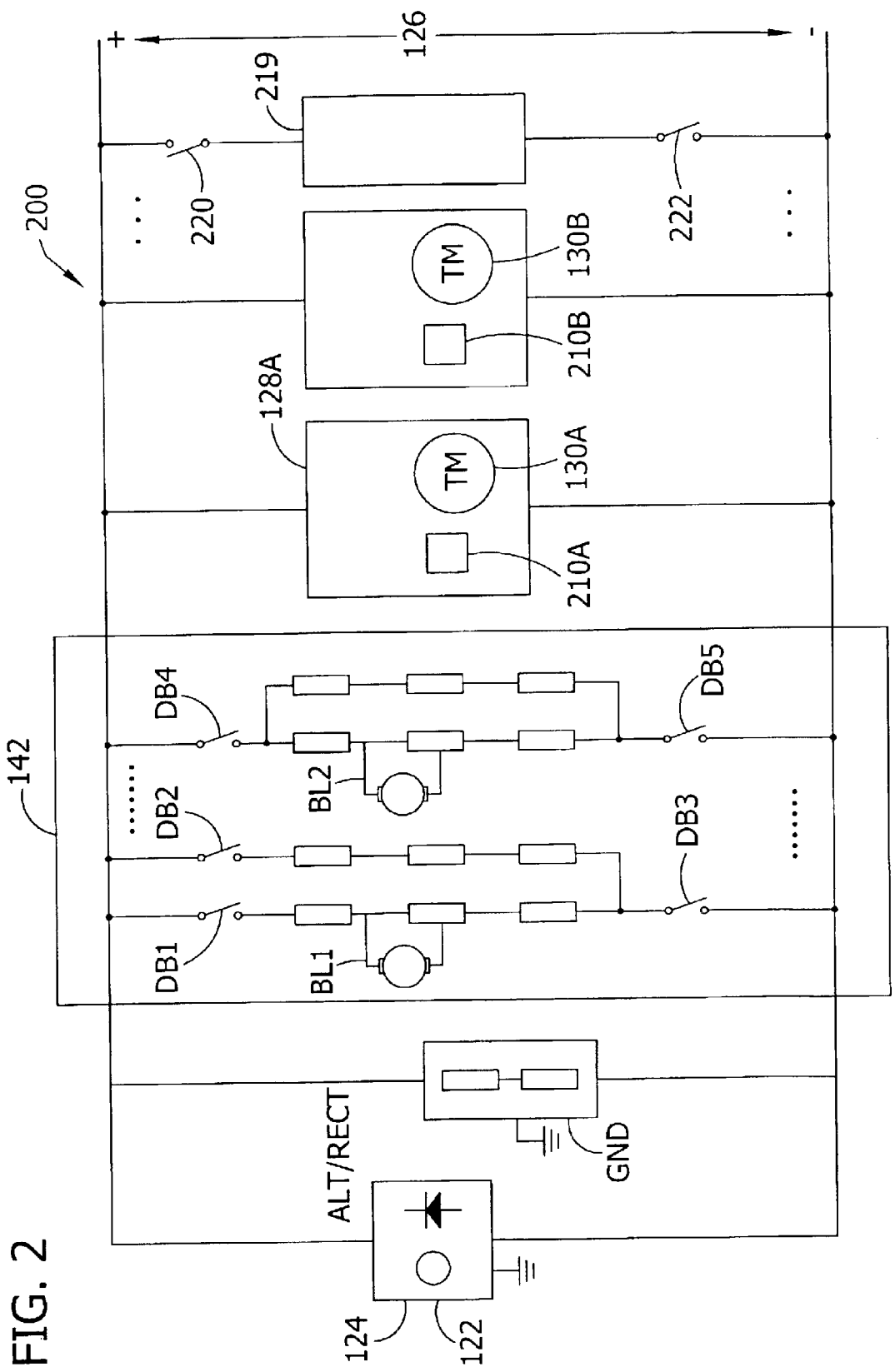
FIG. 2 is a simplified electrical schematic of an AC diesel-electric locomotive according to the invention.

FIG. 2 is an electrical schematic 200 of the locomotive 110 of FIG. 1. The output of the alternator 122 and rectifier 124 is connected to the DC bus 126 which supplies DC power to the plurality of traction motors, of which only two, 130A and 130B, are shown for convenience. The DC bus 126 may also be referred to as a traction bus because it carries the power used by the traction motor subsystems. As explained above, a typical prior art diesel-electric locomotive includes four or six traction motor subsystems.

During braking, the power generated by the traction motors is dissipated through the dynamic braking grid subsystem 142. As illustrated in FIG. 2, a typical prior art dynamic braking grid includes a plurality of contactors (e.g., DB1–DB5) for switching a plurality of power resistive elements between the positive and negative rails of the DC bus 126. Each vertical grouping of resistors may be referred to as a string. One or more power grid cooling blowers (e.g., BL1 and BL2) are normally used to remove heat generated in a string due to dynamic braking.

In FIG. 2, two traction motor subsystems 208 comprising an inverter (e.g., inverter 128A) and a corresponding traction motor (e.g., traction motor 130A) are shown. Each traction motor subsystem 208 also comprises a speed sensor 210 (e.g., speed sensor 210A, referred to generally as speed sensor 210). Speed sensors 210 are used to provide speed signals representative of the rotational speeds in revolutions per minute (RPM) of the shafts of the traction motors 130. These rotational speed signals are readily converted to wheel speed in a well-known manner. The speed sensors are used to monitor for locked axle conditions as is known in the art. However, the speed sensor systems have high failure rates due to the treacherous environment in which they operate. Co-assigned U.S. Pat. No. 5,990,648 entitled "Method for Detecting Locked-Axle Conditions Without a Speed Sensor" (hereinafter "the '648 patent") issued to Kumar et al., which is hereby incorporated by reference in its entirety, describes a method of detecting locked axle conditions without the use of speed sensors.

Figure 3:
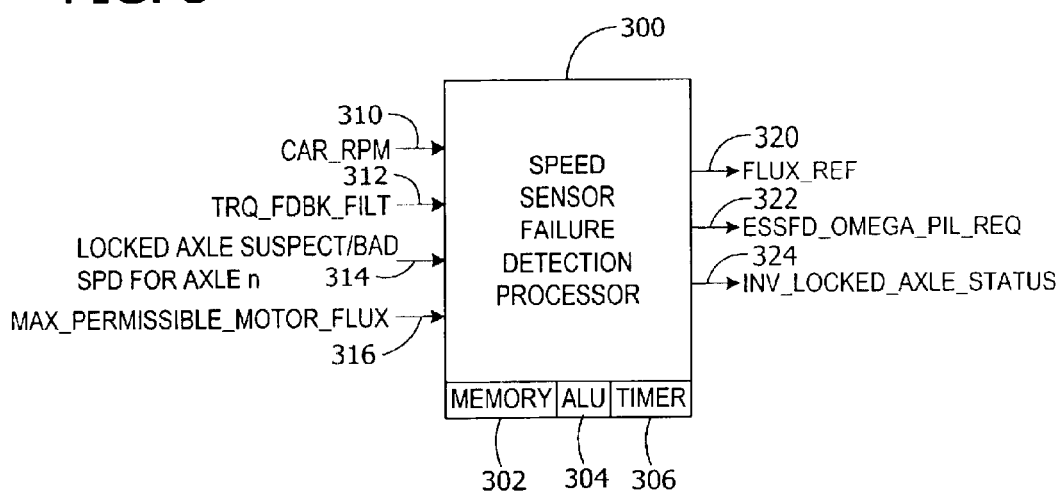
FIG. 3 is a block diagram of a processor of the invention such as may be used for detecting the occurrence of actual locked axle condition.

Controller 140 (see FIG. 1) further includes a speed sensor failure detection processor 300 for distinguishing between potential locked-axle conditions and actual locked axle conditions in the presence of faulty sensor data. As shown in FIG. 3, processor 300 receives the following input signals: a signal representative of locomotive speed 310, such as may be readily obtained from one or more radar sensors or other speed sensors connected to axles not suspected of being subject to a locked axle condition; a signal representative of motor torque feedback 312; a signal representative of a potential locked-axle condition 314; and a signal indicative of the maximum flux level 316 which the processor will be allowed to command. FIG. 3 further shows that processor 300 supplies information in connection with the status of the potentially locked axle 324. Such information may be displayed by a suitable display (not shown) to inform an operator of the presence of the potential locked axle condition so that appropriate corrective measures can be promptly implemented. In addition, such information may be transmitted to a fault storage unit for maintaining fault history in a given locomotive. Other output signals supplied by processor 300 include a signal representative of a motor speed command 322 which may be supplied to the inverter driving the motor coupled to the potentially locked axle; and a signal representative of a flux command 320, which is supplied to the aforementioned inverter. Processor 300 is shown in FIG. 3 as including a memory 302, an arithmetic logic unit 304 and a timer 306.

Figure 4A:
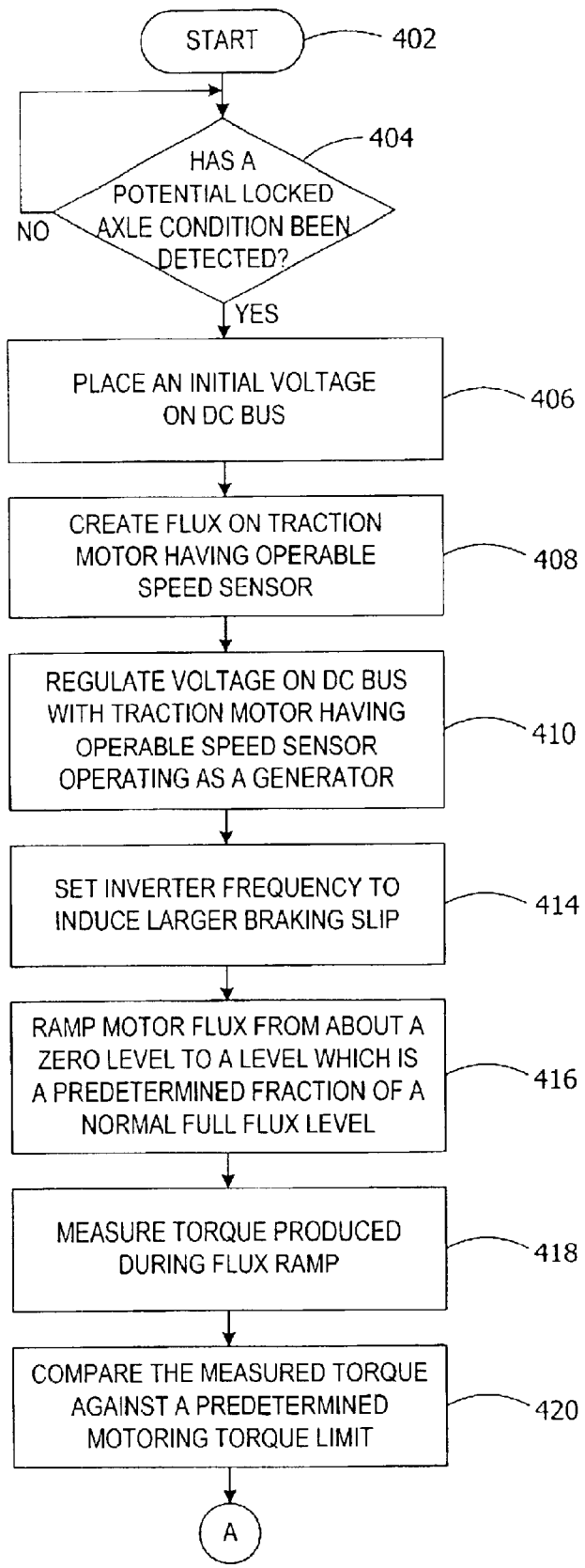
FIGS. 4A–4B collectively show a flow chart of one exemplary embodiment of the detection method of the invention.
Figure 4B:
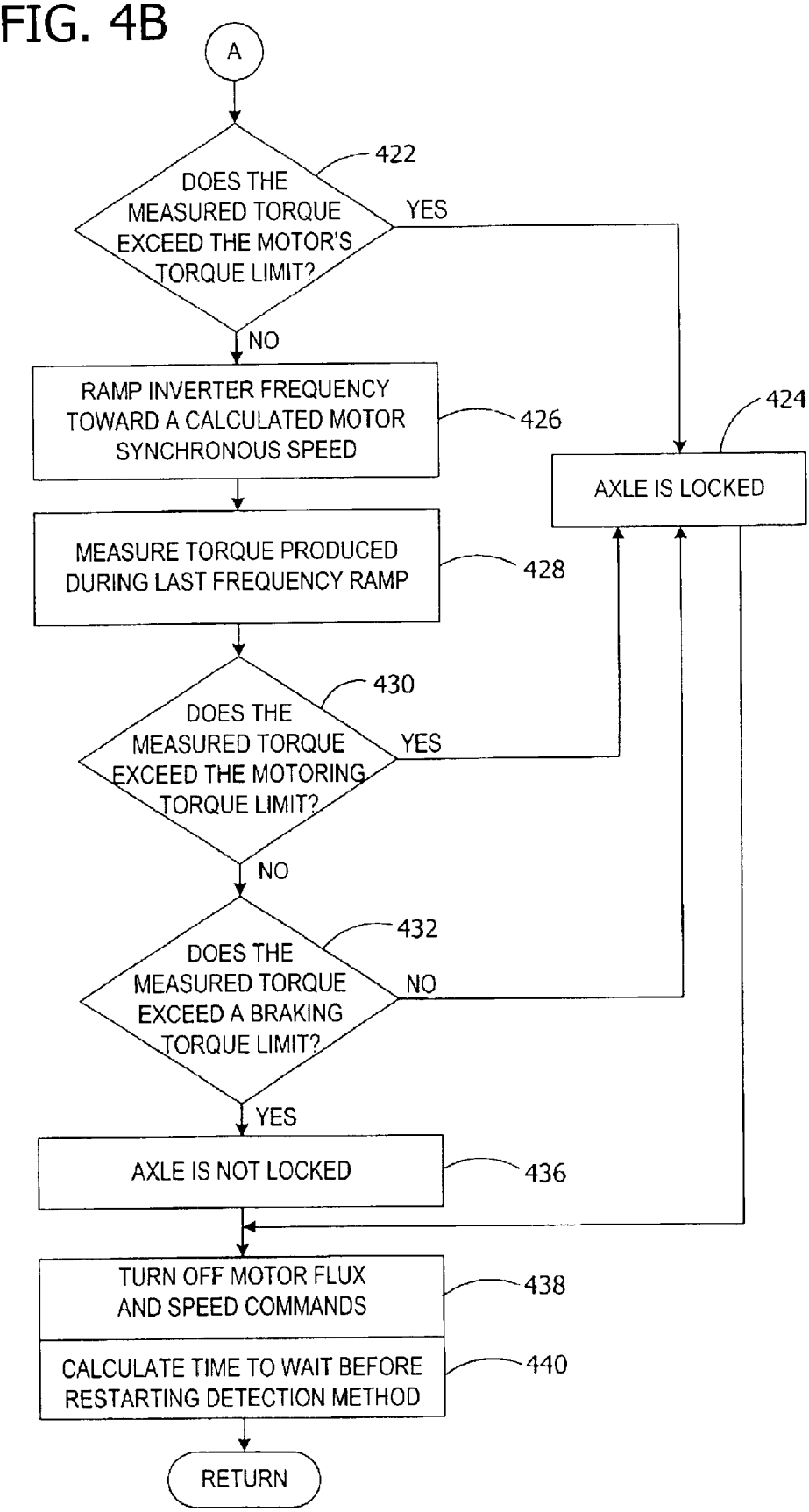

FIGS. 4A–4B, which are interconnected through connecting circle labeled A, collectively show a flow chart useful for describing one embodiment of a method of operating the processor 300 in order to detect a locked-axle condition. In this embodiment, the wheels connected to the suspected locked axle are presumed to be turning freely at or near the locomotive speed. Thus, when a frequency value corresponding to a speed slightly below locomotive speed is applied to the induction motor, if the motor is turning at a speed corresponding to the locomotive speed, then the motor will produce braking torque; and hence a locked axle condition would not be indicated. Conversely, if the axle is locked, then the motor will be at zero speed, and the torque produced by the motor will be a motoring torque.

As illustrated in FIG. 4A, upon start of operations at step 402, a detection step 404 comprises detecting a potential locked axle condition on a locomotive operating in an isolate mode. For example, if the speed sensor value goes to zero while the locomotive system 100 is moving, then this could indicate that either the speed sensor has failed or that in fact the axle is locked. The method described in FIGS. 4A–D reliably distinguish between either of such conditions without having to stop the locomotive system 100 and check the operational status of the speed sensor or other burdensome procedure.

In the example described with respect to FIGS. 1 and 2, locomotive 110B is operated in the isolated mode. Engine 120 on locomotive 112B is not available to power the alternator 122 and rectifier 124 is not available to power the DC bus 126. Therefore, initially the DC bus 126 may be substantially deenergized. For purposes of this example, it is assumed that the speed sensor 210A associated with the traction motor subsystem 208 comprising inverter 128A and corresponding traction motor 130A has failed and the traction motor subsystem 208 comprising inverter 128B and corresponding traction motor 130B has an operating speed sensor 210B. The selection of these traction motor subsystems is for illustrative purposes, and one skilled in the art will recognize that any of the traction motor subsystems can be used as the controlling subsystem.

Step 406 comprises placing an initial voltage on the DC bus 126 with an alternate source of power. The initial voltage can be a voltage substantially less than the voltage normally present on the bus when the engine 120 is supplying the alternator 122 and rectifier 124. In one embodiment, a low voltage control battery 219 is used to provide the initial voltage. As illustrated in FIG. 2, a BJ+ contactor 220 and a BJ− contactor 222 are connected across the DC bus 126. The BJ+ and BJ− contactors 220, 222 connect the low voltage control battery 219 that is typically used to move the locomotive around, especially in buildings or train yards without the use of the diesel engine. Typically the battery is a 75VDC battery, however other low voltage batteries are contemplated. With the BJ+ and BJ− contactors 220, 222 closed, an initial DC voltage is selectively placed on the DC bus 126.

Often there is a residual voltage stored in the alternator as is understood by one skilled in the art. In another embodiment, this residual voltage is selectively applied to provide the initial voltage on the DC bus. In another embodiment, the alternator 122 can be used to selectively supply power from the isolated diesel engine 120 operating at the low speeds. Typically, less than about 5% and more particularly, less than about 1% of the rated power of the diesel engine or about 4 horsepower is necessary to bootstrap the traction motor 130B.

In step 408, the initial voltage on the DC bus is used to create a small flux on the traction motor with the working speed sensor 210 (in this example, traction motor 130B is associated with the working speed sensor) to bootstrap the traction motor 130B.

Step 410 comprises regulating the DC voltage on the DC bus 126 with the traction motor 130B operating as a generator and inverter 128B.

In step 414, the inverter frequency is set for the inverter associated with the speed sensor providing the potential locked axle condition (in this example, inverter 128A) to the to a value that is sufficiently low relative to a calculated motor synchronous speed so as to induce a sufficiently large braking slip. Those skilled in the art will appreciate that the calculated synchronous motor speed can be calculated in controller 130 using well known techniques using information regarding wheel diameter, gear ratio and locomotive speed. By way of example, in one application it has been found that setting the inverter frequency to a value equivalent to 200 RPM below the calculated motor synchronous speed is sufficient to induce a relatively large braking slip.

Step 416 comprises varying the level of electromagnetic flux in the motor associated with the speed sensor providing the potential locked axle contrition (in this example, motor 130A). The flux variation may occur in the form of ramping the level of flux from a level of about zero to a level which is a predetermined fraction of a full flux level normally used by the motor. The motor 130B regulating the voltage on the DC bus is used to control the flux variation. Such fractional level flux selection ensures that a high torque is not produced by the traction motor even if the frequency value selected in step 414 is slightly off. By way of example, in that the same application referenced above, the predetermined fractional level was conveniently chosen to have a value of about 10% of the normal full flux level used by the motor.

At step 418, the torque produced during the flux ramping step 416 is measured by the torque sensor. Step 420 comprises comparing any measured torque, such as motoring torque, against a predetermined motoring torque limit, which may be conveniently stored in circuit memory 302 (FIG. 3). The comparing step can be readily performed in arithmetic logic unit 304 (FIG. 3). As illustrated in FIG. 4C, step 422 allows for making at least an initial determination based on the measured motoring torque as to whether the potential or suspected locked-axle condition is an actual locked axle condition. In particular, if the motoring torque measured in step 420 exceeds the motoring torque limit then this would indicate that the axle is not rotating; and an actual locked axle condition would be indicated in step 424.

If the measured motoring torque does not exceed the motoring torque limit, then step 426 allows for ramping the frequency value toward a value which is close to the calculated motor synchronous speed but is not equal to or above the calculated motor synchronous speed. Step 428 then allows for measuring torque, such as motoring or braking torque produced during frequency ramping step 426. Step 430 allows for comparing whether the measured torque, such as motoring torque, exceeds the motoring torque limit; if it does, then a locked axle condition is indicated in step 424. Step 432 allows for comparing whether the measured torque, such as braking torque, exceeds the braking torque limit which may be conveniently stored in memory 302 (FIG. 3). If the measured braking torque does not exceed the braking torque limit, then step 424 indicates that the axle is locked. However, if the measured braking torque exceeds the braking torque limit, then step 436 indicates that the suspected locked axle condition does not correspond to an actual locked axle condition; i.e., the axle is actually rotating.

Step 438 allows for resetting various signals representative of parameters such as motor flux and speed command. Prior to end of operations in step 442, step 440 allows for calculating, using timer circuit 306 (FIG. 3), a suitable time to wait before restarting the method at step 402.

It will be appreciated by those skilled in the art that this alternative embodiment is not limited to detection of axle rotation about a zero speed since any given rotational speed of the axle may be conveniently detected, without use of a speed sensor coupled to that axle, by choosing suitable first and second inverter frequency values. For example, if the given speed is 100 RPM, then one could choose a first frequency value of about 30 RPM and a second frequency value of about 170 RPM to verify whether in fact the axle is rotating near 100 RPM.

Alternately, other methods of detecting locked-axle conditions without speed sensors, such as the additional methods identified in the '648 patent, can be used.

As the prime mover power is supplied by traction motor 130B operating as a generator, when the locomotive system 100 (FIG. 1) comes to a stop, the traction motor 130B stops generating power. Thus, the generator cannot maintain a voltage on the DC bus 126, voltage on the bus drops to substantially zero, ensuing an inherently safe condition on which to operate on the equipment associated with the DC bus 126.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

It will be understood that the specific embodiments of the invention shown and described herein are exemplary only.

Numerous variations, changes, substitutions and equivalents will now occur to those skilled in the art without departing from the spirit and scope of the present invention. Accordingly, it is intended that all subject matter described herein and shown in the accompanying drawings be regarded as illustrative only and that the scope of the invention be solely determined by the appended claims.

What is claimed is:

1. A method for detecting the occurrence of an actual locked condition in one or more of a plurality of AC traction motors which are reconfigurable to operate as AC generators, wherein said AC traction motors connected to a common DC bus, said method comprising:
   detecting a potential locked condition in a first motor;
   energizing the DC bus with an initial voltage using an alternate source of power;
   regulating the DC bus voltage with a second motor of the plurality of AC traction motors by reconfiguring the second motor to operate as a generator;
   measuring torque produced by the first motor at a plurality of levels of electromagnetic flux in the first motor; and
   determining based on the measured torque whether the potential locked condition is an actual locked condition.

2. The method of claim 1 wherein energizing the DC bus is performed with a low-voltage battery.

3. The method of claim 2 wherein energizing the DC bus including selectively connecting the DC bus to the low-voltage battery until the second motor is operating as a generator then open-circuiting the battery.

4. The method of claim 1 wherein energizing the DC bus is performed with residual voltage from an alternator coupled to the DC bus.

5. The method of claim 1 wherein energizing the DC bus is performed with a diesel engine operating at less than 5% of it rated power.

6. The method of claim 5 wherein:
   detecting comprises detecting a potential locked axle condition in an axle coupled to the first motor; and
   wherein determining comprises determining based on the measured torque whether the potential locked-axle condition is an actual locked axle condition.

7. The method of claim 6 further comprising setting the frequency of an inverter which controls the first traction motor coupled to the potentially locked axle to a predetermined frequency value, whereby the level of electromagnetic flux in the first motor is varied, and wherein measuring the torque comprises measuring a torque produced by the first motor as the flux varies step.

8. The method of claim 6 further comprising setting the frequency of an inverter which controls the first motor coupled to the potentially locked axle to a predetermined first frequency value at a first frequency polarity, varying the level of electromagnetic flux in the first motor, measuring torque produced by the motor while operating at the predetermined frequency value and first polarity, setting the inverter frequency to a second value which is substantially the same as said predetermined first frequency value and at a second frequency polarity opposite to the first polarity, wherein measuring the torque comprises measuring torque produced by the first motor while operating at the second frequency value and polarity, and determining based on the respective values of torque measured during the measuring steps whether the potential locked-axle condition is an actual locked axle condition.

9. The method of claim 1 wherein measuring the torque comprises setting the frequency of an inverter which controls the first traction motor to a predetermined frequency value, varying the level of electromagnetic flux in the first motor, and measuring torque produced by the first motor during the flux varying step.

10. The method of claim 1 wherein measuring the torque comprises setting the frequency of an inverter which controls the first motor to a predetermined first frequency value at a first frequency polarity, varying the level of electromagnetic flux in the first motor, measuring torque produced by the first motor while operating at the predetermined frequency value and first polarity, setting the inverter frequency to a second value which is substantially the same as said predetermined first frequency value and at a second frequency polarity opposite to the first polarity, measuring torque produced by the first motor while operating at the second frequency value and polarity, and determining based on the respective values of torque measured during the measuring steps whether the potential locked-axle condition is an actual locked axle condition.

11. A system for detecting the occurrence of an actual locked-axle condition in an isolated vehicle having a plurality of AC traction motors which are reconfigurable to operate as AC generators, said AC traction motors connected to a common DC bus, said system comprising:
- a speed sensor detecting a potential locked axle condition in an axle coupled to a first motor of the plurality of AC traction motors;
- a power supply energizing the DC bus with an initial voltage using an alternate source of power;
- a voltage regulator regulating DC bus voltage with a second motor of the plurality of AC traction motors by reconfiguring the second motor to operate as a generator;
- a torque sensor measuring a torque produced by the first motor at a plurality of levels of electromagnetic flux in the first motor; and
- a processor determining based on the measured torque whether the potential locked-axle condition is an actual locked axle condition.

12. The system of claim 11 wherein the power supply comprises a low-voltage battery for energizing the DC bus.

13. The system of claim 12 wherein the power supply intermittently connects the low-voltage battery to the DC bus.

14. The system of claim 11 wherein the power supply comprises a residual voltage from an alternator coupled to the DC bus for energizing the DC bus.

15. The system of claim 11 wherein the power supply comprises a diesel engine operating at less than 5% of it rated power for energizing the DC bus.

16. The system of claim 11 wherein the power supply sets the frequency of an inverter which controls the first traction motor coupled to the potentially locked axle to a predetermined frequency value, wherein the voltage regulator varies the level of electromagnetic flux in the first motor, and wherein the torque sensor measures the torque produced by the first motor during the varying flux.

17. The system of claim 11 wherein the power supply sets the frequency of an inverter which controls an AC motor coupled to the potentially locked axle to a predetermined first frequency value at a first frequency polarity, wherein a voltage regulator varies the level of electromagnetic flux in the motor, and wherein the torque sensor measures the torque produced by the motor while operating at the predetermined frequency value and first polarity, wherein the power supply sets the inverter frequency to a second value which is substantially the same as said predetermined first frequency value and at a second frequency polarity opposite to the first polarity, wherein the torque sensor measures the torque produced by the motor while operating at the second frequency value and polarity, and wherein the processor determines based on the respective values of torque measured during the measuring steps whether the potential locked-axle condition is an actual locked axle condition.

* * * * *